US011978956B2

(12) United States Patent
Elovsson et al.

(10) Patent No.: US 11,978,956 B2
(45) Date of Patent: May 7, 2024

(54) ANTENNA ARRANGEMENTS AND MICROWAVE DEVICES WITH IMPROVED ATTACHMENT MEANS

(71) Applicant: Gapwaves AB, Gothenburg (SE)

(72) Inventors: Magnus Elovsson, Torslanda (SE); Mattias Ulenius, Gothenburg (SE)

(73) Assignee: GAPWAVES AB, Gothenburg (SE)

( * ) Notice: Subject to any disclaimer, the term of this patent is extended or adjusted under 35 U.S.C. 154(b) by 0 days.

(21) Appl. No.: 17/796,362

(22) PCT Filed: Nov. 20, 2020

(86) PCT No.: PCT/EP2020/082921
§ 371 (c)(1),
(2) Date: Jul. 29, 2022

(87) PCT Pub. No.: WO2021/151538
PCT Pub. Date: Aug. 5, 2021

(65) Prior Publication Data

US 2023/0084399 A1 Mar. 16, 2023

(30) Foreign Application Priority Data

Jan. 31, 2020 (SE) .................................. 2030028-1

(51) Int. Cl.
*H01Q 15/00* (2006.01)
*H01Q 1/52* (2006.01)
(Continued)

(52) U.S. Cl.
CPC ........... *H01Q 15/006* (2013.01); *H01Q 1/526* (2013.01); *H01Q 15/141* (2013.01);
(Continued)

(58) Field of Classification Search
CPC .. H01Q 21/005; H01Q 21/061; H01Q 15/006; H01Q 1/526; H01Q 15/141; H01Q 21/0025; H01P 11/001
See application file for complete search history.

(56) References Cited

U.S. PATENT DOCUMENTS

| | | | | |
|---|---|---|---|---|
| 3,653,052 A * | 3/1972 | Campbell | H01Q 1/286 | 343/873 |
| 6,825,741 B2 * | 11/2004 | Chappell | H01P 1/203 | 333/204 |

(Continued)

FOREIGN PATENT DOCUMENTS

| | | |
|---|---|---|
| JP | 2011103578 A | 5/2011 |
| RU | 2696676 C1 | 8/2019 |
| WO | 2004042864 A2 | 5/2004 |

OTHER PUBLICATIONS

International Search Report (PCT/ISA/210) and Written Opinion (PCT/ISA/237) dated Feb. 1, 2021, by the European Patent Office as the International Searching Authority for International Application No. PCT/EP2020/082921. (13 pages).

(Continued)

*Primary Examiner* — Vibol Tan
(74) *Attorney, Agent, or Firm* — BUCHANAN, INGERSOLL & ROONEY PC

(57) ABSTRACT

An antenna arrangement having a stacked layered structure. The antenna arrangement includes a radiation layer including one or more radiation elements, and a distribution layer facing the radiation layer. The distribution layer is arranged to distribute a radio frequency signal to the one or more radiation elements. The distribution layer includes at least one distribution layer feed. Any of the distribution layer and the radiation layer includes a first electromagnetic bandgap, EBG, structure arranged to form at least one first waveguide intermediate the distribution layer and the radiation layer.
(Continued)

The first EBG structure is arranged to prevent electromagnetic radiation in a frequency band of operation from propagating from the first waveguide in directions other than through the distribution layer feed and the one or more radiation elements. The radiation layer and the distribution layer are attached to each other with one or more fastening members including respective deformable tails.

12 Claims, 7 Drawing Sheets

(51) Int. Cl.

| | |
|---|---|
| ***H01Q 15/14*** | (2006.01) |
| ***H01Q 21/00*** | (2006.01) |
| ***H01Q 21/06*** | (2006.01) |

(52) U.S. Cl.

CPC ....... *H01Q 21/0025* (2013.01); *H01Q 21/005* (2013.01); *H01Q 21/061* (2013.01)

(56) References Cited

U.S. PATENT DOCUMENTS

| | | | | |
|---|---|---|---|---|
| 6,947,008 | B2 * | 9/2005 | Tillery | H01Q 1/246 343/893 |
| 8,120,543 | B2 * | 2/2012 | Sulima | H01Q 13/12 343/702 |
| 10,285,312 | B2 * | 5/2019 | Suorsa | H05K 9/0088 |
| 10,559,889 | B2 * | 2/2020 | Kirino | H01Q 21/005 |
| 10,601,144 | B2 * | 3/2020 | Kamo | H01Q 21/005 |
| 2018/0301815 | A1 * | 10/2018 | Kamo | H01Q 21/005 |
| 2019/0109361 | A1 | 4/2019 | Ichinose et al. | |
| 2020/0076037 | A1 * | 3/2020 | Kishk | H01P 3/006 |
| 2020/0185802 | A1 | 6/2020 | Vilenskiy et al. | |

OTHER PUBLICATIONS

Kildal, Per-Simon et al., "Design and Experimental Verification of Ridge Gap Waveguide in Bed of Nails for Parallel Plate Mode Suppression", IET Microwaves Antennas & Propagation, Feb. 21, 2022, pp. 262-270, vol. 5, No. 3. (22 pages).

* cited by examiner

ANTENNA ARRANGEMENTS AND MICROWAVE DEVICES WITH IMPROVED ATTACHMENT MEANS

TECHNICAL FIELD

The present disclosure relates to microwave devices, such as waveguides, transmission lines, waveguide circuits, transmission line circuits or radio frequency parts of an antenna system, and particularly to antenna arrays. The microwave devices and antenna arrays are suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency (RF) signals, i.e. electromagnetic signals.

The radiation arrangement of a transceiver often comprises an antenna array, since an array allows high control of shaping the radiation pattern, e.g. for high directivity, beam steering, and/or multiple beams. An antenna array comprises a plurality of radiation elements that commonly are spaced less than a wavelength apart, where the wavelength corresponds to the operational frequency of the transceiver. Generally, the more radiation elements in the array, the better the control of the radiation pattern.

As either or both of the number of radiation elements and the operational frequency increase, manufacturing tolerances for antenna arrays start to become challenging. This problem is especially severe for antenna arrays at millimeter wave frequencies which may comprise over a hundred radiation elements. One particular problem lay in the attachment of the various layers in the antenna arrangement. Current solutions commonly use either screws or soldering methods, which are difficult to utilize in large volumes with high yield and at low cost. Such solutions also have problems with undesired electromagnetic leakage.

SUMMARY

It is an object of the present disclosure to provide a new antenna arrangements and microwave devices in general, which, among other things, offer high manufacturing yields through improved attachment and assembling techniques with improved sensitivity to manufacturing tolerances and improved manufacturing simplicity, and at the same time offer high performance in terms of, e.g., losses and leakage.

This object is at least in part obtained by an antenna arrangement having a stacked layered structure. The antenna arrangement comprises a radiation layer comprising one or more radiation elements, and a distribution layer facing the radiation layer. The distribution layer is arranged to distribute a radio frequency signal to the one or more radiation elements. The distribution layer comprises at least one distribution layer feed. Any of the distribution layer and the radiation layer comprises a first electromagnetic bandgap, EBG, structure arranged to form at least one first waveguide intermediate the distribution layer and the radiation layer. The first EBG structure is also arranged to prevent electromagnetic radiation in a frequency band of operation from propagating from the at least one first waveguide in directions other than through the at least one distribution layer feed and the one or more radiation elements. The radiation layer and the distribution layer are attached to each other with one or more fastening members comprising respective deformable tails.

The assembly of antenna arrangements comprising conventional waveguide structures is complex and costly due to the demanding manufacturing tolerances. The present disclosure lowers the complexity and cost by having the antenna arrangement comprise EBG structures, and by attaching the layers of the antenna arrangement together with fastening means comprising deformable tails. Examples of such fastening means are rivets, bosses, and studs. This type of attachment is enabled by the EBG structures since they lower the required manufacturing and assembling tolerances. The EBG structures also overcomes the problem of leakage, i.e., undesired electromagnetic coupling between, e.g., adjacent waveguides. EBG structures further present compact designs and low loss. A consequence of this is that a higher signal to noise ratio can be maintained due to the use and placement of EBG structures in the distribution layer, which is advantageous. Another advantage is that there is no need for electrical contact between the two layers constituting the waveguide. This is an advantage since high precision assembly is not necessary since electrical contact need not be verified. Electrical contact between the layers is, however, also an option The fastening member is a mechanical fastener. A fastening member with a deformable tail can be a rivets, boss, or stud. A fastening member with a deformable tail is not screw, bolt or the like. Unlike screws, bolt and the like, a fastening member with a deformable tail forms a permanent joint between two members.

A boss may be an integral part of a member or even a monolithically formed on a layer, i.e., simply a protrusion from a layer. A boss could also be soldered onto a member or be attached in other ways. After the boss is placed in a corresponding mating hole in the other member, the tail of the boss, i.e., the end of the boss, is deformed to expand, thereby joining the members together.

According to aspects, at least one fastening member is integrally and preferably monolithically formed on the distribution layer, and the tail of that particular fastening member is arranged in a corresponding mating hole on the radiation layer. According to other aspects, at least one fastening member is integrally and preferably monolithically formed on the radiation layer, and the tail of that of that particular fastening member is arranged in a corresponding mating hole on the distribution layer. This allows for low-cost manufacturing and easy assembly.

According to aspects, the tail of at least one fastening member is deformed by any of staking. This allows for low-cost manufacturing and easy assembly.

According to aspects, at least one fastening member is any of a solid rivet, blind rivet, semi-tubular rivet, and self-piercing rivet.

According to aspects, at least one of the one or more radiation elements comprises an aperture. An aperture of the radiation layer may for example be a slot opening extending through the radiation layer. A radiation element comprising an aperture allows for a radiation layer with low loss and that is easy to manufacture.

According to aspects, the first EBG structure comprises a repetitive structure of protruding elements. This allows for an EBG structure that is easy to manufacture and that provides low loss in the first waveguide and high attenuation of electromagnetic radiation in a frequency band of operation propagating from the at least one first wave guide in directions other than through the at least one distribution layer feed and the one or more radiation elements.

According to aspects, the protruding elements are monolithically formed on the layer comprising the EBG structure. This allows for low-cost manufacturing and easy assembly.

According to aspects, any of the distribution layer and the radiation layer comprises at least one waveguide ridge, thereby forming at least one first ridge gap waveguide intermediate the distribution layer and the radiation layer. This allows for low-cost manufacturing and easy assembly.

According to aspects, the antenna arrangement further comprises a printed circuit board, PCB, layer facing the distribution layer, wherein the PCB layer comprises at least one PCB layer feed. According to further aspects, the antenna arrangement further comprises a shield layer facing the PCB layer.

According to aspects, at least one fastening member is integrally and preferably monolithically formed on the distribution layer, and the tail of that particular fastening member is arranged in a corresponding mating hole on the PCB layer and/or a corresponding mating hole in the shield layer. According to other aspects, at least one fastening member is integrally and preferably monolithically formed on the shield layer, and the tail of that particular fastening member is arranged in a corresponding mating hole on the PCB layer and/or a corresponding mating hole on the distribution layer. According to further aspects, at least one fastening member is integrally and preferably monolithically formed on the shield layer, and the tail of that particular fastening member is arranged in corresponding mating holes in the PCB layer, the distribution layer, and the radiation layer. This allows for low-cost manufacturing and easy assembly.

According to aspects, the shield layer comprises a second EBG structure arranged to form at least one second waveguide intermediate the shield layer and the PCB layer. The second EBG structure is also arranged to prevent electromagnetic radiation in a frequency band of operation from propagating from the at least one second waveguide in directions other than through the at least one PCB layer feed. The second EBG structure allows a compact design with low loss and low leakage, i.e., unwanted electromagnetic propagation between, e.g., adjacent waveguides or between adjacent RFICs. Furthermore, the second EBG structure shields the PCB layer from electromagnetic radiation outside of the antenna arrangement.

According to aspects, the second EBG structure comprises a repetitive structure of protruding elements, and wherein the PCB layer comprises a ground plane and at least one planar transmission line, thereby forming at least one second gap waveguide intermediate the shield layer and the PCB layer. This allows for low-cost manufacturing and easy assembly.

According to aspects, a telecommunication or radar transceiver comprising the antenna arrangement.

There is also disclosed herein a microwave device comprising a first conductive layer and a second conductive layer facing each other. Any of the first and the second conductive layers comprise an electromagnetic bandgap, EBG, structure arranged to form at least one first waveguide intermediate the first and the second conductive layers. The EBG structure is also arranged to prevent electromagnetic radiation in a frequency band of operation from propagating from the at least one first waveguide in directions other than along an intended waveguiding path. The first and the second conductive layers are attached to each other with one or more fastening members comprising respective deformable tails.

The assembly of microwave device comprising conventional waveguide structures is complex and costly due to the demanding manufacturing tolerances. The present disclosure lowers the complexity and cost by having the microwave device comprise EBG structures, and by attaching the layers of the microwave device together with fastening means comprising deformable tails. Examples of such fastening means are rivets, bosses, and studs. This type of attachment is enabled by the EBG structures since they lower the required manufacturing and assembling tolerances. The EBG structures also overcomes the problem of leakage, i.e., undesired electromagnetic coupling between, e.g., adjacent waveguides. EBG structures further present compact designs and low loss. An advantage is that there is no need for electrical contact between the two layers constituting the waveguide. This is an advantage since high precision assembly is not necessary since electrical contact need not be verified. Electrical contact between the layers is, however, also an option The fastening member is a mechanical fastener. A fastening member with a deformable tail can be a rivets, boss, or stud. A fastening member with a deformable tail is not screw, bolt or the like. Unlike screws, bolt and the like, a fastening member with a deformable tail forms a permanent joint between two members.

A boss may be an integral part of a member or even a monolithically formed on a layer, i.e., simply a protrusion from a layer. A boss could also be soldered onto a member or be attached in other ways. After the boss is placed in a corresponding mating hole in the other member, the tail of the boss, i.e., the end of the boss, is deformed to expand, thereby joining the members together.

According to aspects, the microwave device is any of a waveguide, transmission line, waveguide circuit, transmission line circuit, and radio frequency part of an antenna system.

According to aspects, at least one fastening member is integrally and preferably monolithically formed on the first conductive layer, and the tail of that fastening member is arranged in mating hole on the second conductive layer. This allows for low-cost manufacturing and easy assembly.

According to aspects, the tail of at least one fastening member is deformed by staking.

According to aspects, at least one fastening member is any of a solid rivet, blind rivet, semi-tubular rivet, and self-piercing rivet.

According to aspects, the EBG structure comprises a repetitive structure of protruding elements. This allows for low-cost manufacturing and easy assembly.

According to aspects, the protruding elements are monolithically formed on any of the first and second conductive layers. This allows for low-cost manufacturing and easy assembly.

According to aspects, any of the first and the second conductive layers comprises at least one waveguide ridge, thereby forming at least one first ridge gap waveguide intermediate the first and the second conductive layers. This allows for low-cost manufacturing and easy assembly.

There is also disclosed herein a method for producing a microwave device. The method comprises:

providing a first conductive layer having an electromagnetic bandgap, EBG, structure;

arranging a second conductive layer over the first conductive layer, thereby enclosing the EBG structure and forming at least one first waveguide intermediate the first and the second conductive layers, wherein the EBG structure prevents electromagnetic radiation in a frequency band of operation from propagating from the at least one first waveguide in directions other than along an intended waveguiding path; and attaching the first and the second conductive layers to each other with one or more fastening members comprising respective deformable tails.

According to aspects, the microwave device of the method above is any of a waveguide, transmission line, waveguide circuit, transmission line circuit, or radio frequency part of an antenna system.

The methods disclosed herein are associated with the same advantages as discussed above in connection to the different apparatuses. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
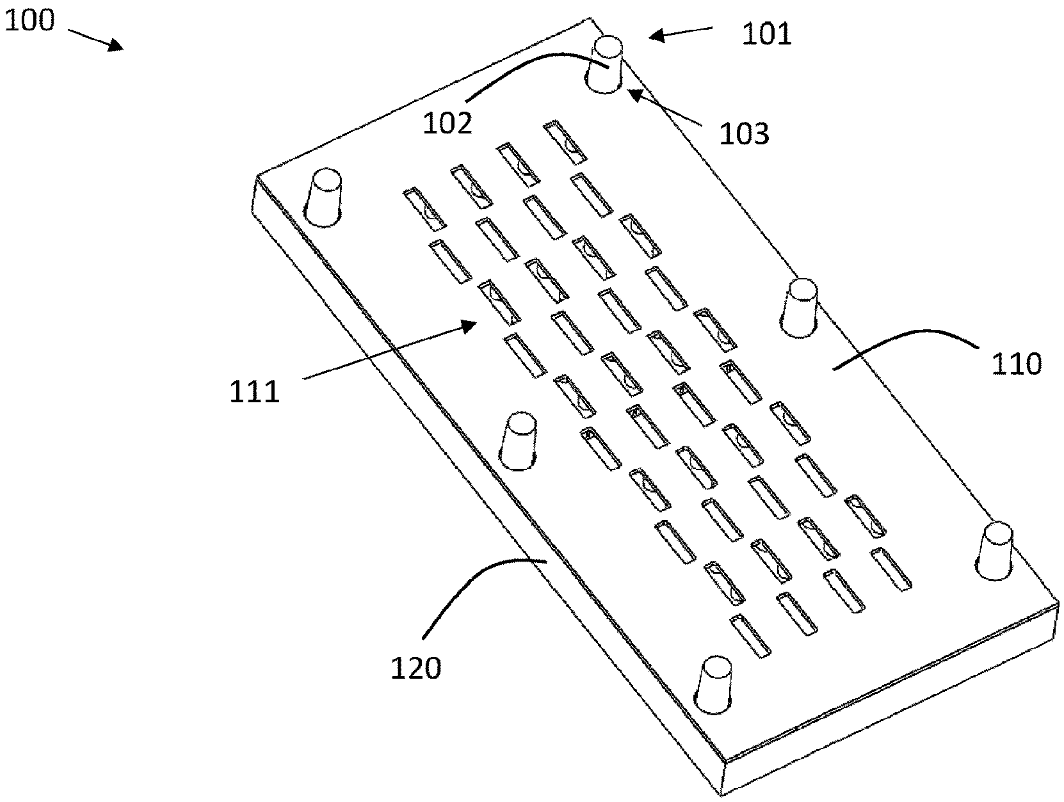
FIGS. 1A and 1B illustrate example antenna arrangements.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

There are disclosed herein various types of antenna arrangements. FIGS. 1A, 1B, 2A, 2B, and 3A show antenna arrangements having a stacked layered structure. A stacked layered structure is a structure comprising a plurality of planar elements referred to as layers. Each planar element has two sides, or faces, and is associated with a thickness. The thickness is much smaller than the dimension of the faces, i.e., the layer is a flat or approximately planar element, i.e., as in an arcuate shape. According to some aspects, a layer is rectangular or square. However, more general shapes are also applicable, including circular or elliptical disc shapes. The stacked layered structure is stacked in the sense that layers are arranged on top of each other. In other words, the layered structure can be seen as a sandwich structure.

The antenna arrangement in FIG. 1A comprises a radiation layer 110 with a plurality of radiation elements 111. In the example antenna arrangement in FIGS. 1A and 1B, the radiation elements are slot antennas. A slot antenna is an example of an aperture. In general, a distribution layer 120 (shown in FIGS. 2A, 2B, and 3A) distributes one or more radio frequency signals to and from one or more radiation elements in the plurality of radiation elements.

As either or both of the number of radiation elements and the operational frequency increase, manufacturing tolerances for antenna arrays start to become challenging. This problem is especially severe for antenna arrays at millimeter wave frequencies which may comprise over a hundred radiation elements. One particular problem lay in the attachment of the various layers in the antenna arrangement. In particular, assembling conventional waveguides comprising two parts requires high precision. Such two parts are commonly attached to each other with screws or soldering methods, which are complicated and costly from a manufacturing point of view. Such methods further often have problems with leakage, i.e., undesired electromagnetic coupling between, e.g., adjacent waveguides. Cheap and low complexity attachment means, such as rivets, are not possible since they cannot meet manufacturing tolerances. Rivets, e.g., often require a slip fit between its tail and the corresponding mating hole, which lowers placement tolerances.

Electromagnetic bandgap, EBG, structures, present compact designs, low loss, low leakage, and forgiving manufacturing and assembling tolerances. EBG structures in antenna arrangements are arranged to form at least one waveguide intermediate two layers. EBG structures are also arranged to prevent electromagnetic radiation in a frequency band of operation from propagating along the layers except through the at least one waveguide. Thus, EBG structures may be arranged to prevent unwanted electromagnetic propagation between adjacent waveguides. The at least one waveguide couples the electromagnetic signal in the band of operation to one or more feeds and/or to one or more radiation elements. EBG structures prevent propagation by attenuation. Herein, to attenuate is interpreted as to significantly reduce an amplitude or power of electromagnetic radiation, such as a radio frequency signal. The attenuation is preferably complete, in which case attenuate and block are equivalent, but it is appreciated that such complete attenuation is not always possible to achieve.

EBG structures form a surface that acts a magnetic conductor. If the magnetically conductive surface faces an electrically conductive surface, and if the two surfaces are arranged at a distance less than a quarter of a center frequency, no electromagnetic waves in the frequency band of operation can, in the ideal case, propagate along the intermediate surfaces, since all parallel plate modes are cut-off in that frequency band. The center frequency is in the middle of the frequency band of operation. In a realistic scenario, the electromagnetic waves in the frequency band of operation are attenuated per length along the intermediate surfaces.

There exists a multitude of EBG structures. The EBG elements of the EBG structure are arranged in a periodic or quasi-periodic pattern in one, two or three dimensions, as will be discussed in more detail below in connection to FIGS. 7A-D. Herein, a quasi-periodic pattern is interpreted to mean a pattern that is locally periodic but displays no long-range order. A quasi-periodic pattern may be realized in one, two or three dimensions. As an example, a quasi-periodic pattern can be periodic at length scales below ten times an EBG element spacing, but not at length scales over 100 times the EBG element spacing.

An EBG structure may comprise at least two EBG element types, the first type of EBG element comprising an electrically conductive material and the second type of EBG element comprising an electrically insulating material. EBG elements of the first type may be made from a metal such as copper or aluminum, or from a non-conductive material like PTFE or FR-4 coated with a thin layer of an electrically conductive material like gold or copper. EBG elements of the first type may also be made from a material with an electric conductivity comparable to that of a metal, such as a carbon nanostructure or electrically conductive polymer. As an example, the electric conductivity of EBG elements of the first type can be above $10^3$ Siemens per meter (S/m). Preferably, the electric conductivity of EBG elements of the first type is above $10^5$ S/m. In other words, the electric conductivity of EBG elements of the first type is high enough that the electromagnetic radiation can induce currents in the EBG elements of the first type, and the electric conductivity of EBG elements of the second type is low enough that no currents can be induced in EBG elements of the second type. EBG elements of the second type may optionally be non-conductive polymers, vacuum, or air. Examples of such non-conductive EBG element types also comprise FR-4 PCB material, PTFE, plastic, rubber, and silicon.

Figure 7A:
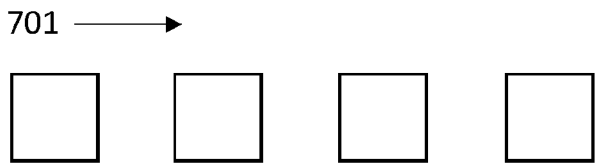
FIGS. 7A, 7B, 7C, and 7D show example symmetry patterns.
Figure 7B:
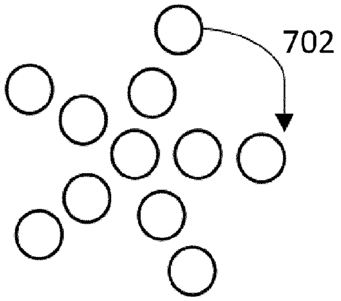
Figure 7C:
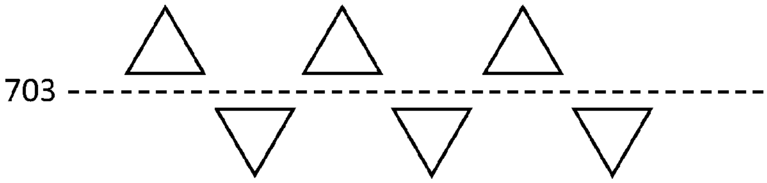
Figure 7D:
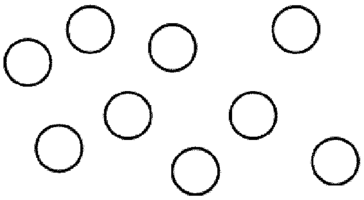

Referring to FIGS. 7A-D, EBG elements of the first and second type may be arranged in a pattern characterized by any of translational (701 in FIG. 7A), rotational (702 in FIG. 7B), or glide symmetry (see the symmetry line 703 in FIG. 7C), or a periodic, quasi-periodic or irregular pattern (see FIG. 7D).

The physical properties of the EBG elements of the second type also determines the dimensions required to obtain attenuation of electromagnetic propagation past the EBG structure. Thus, if the second type of material is chosen to be differently from air, the required dimensions of the first type of EBG element changes. Consequently, a reduced size antenna array can be obtained by varying the choice of material for the first and the second type of element. Advantageously, a reduced size antenna array may be obtained from such a choice.

The EBG elements of the first type may be arranged in a periodic pattern with some spacing. The spaces between the EBG elements of the first type constitute the elements of the second type. In other words, the EBG elements of the first type are interleaved with EBG elements of the second type. Interleaving of the EBG elements of the first and second type can be achieved in one, two or three dimensions.

A size of the EBG elements of either the first or the second type, or both, is smaller than the wavelength in air of electromagnetic radiation in the frequency band. As an example, defining the center frequency as the frequency in the middle of the frequency band, the EBG element size is between ⅕th and 1⁄50th of the wavelength in air of electromagnetic radiation at the center frequency. Here, the EBG element size is interpreted as the size of an EBG element in a direction where the electromagnetic waves are attenuated, e.g. along a surface that acts as a magnetic conductor. As an example, for an EBG element comprising a vertical rod with a circular cross-section and with electromagnetic radiation propagating in the horizontal plane, the size of the EBG element corresponds to a length or diameter of the cross-section of the rod.

Figure 6A:
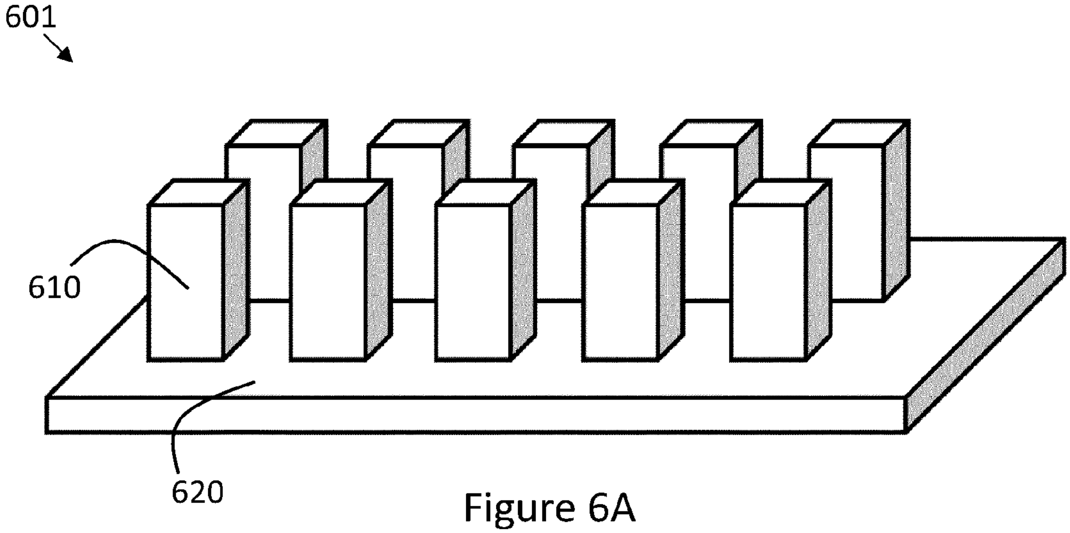
FIGS. 6A, 6B, and 6C show examples of electromagnetic bandgap structures.
Figure 6B:
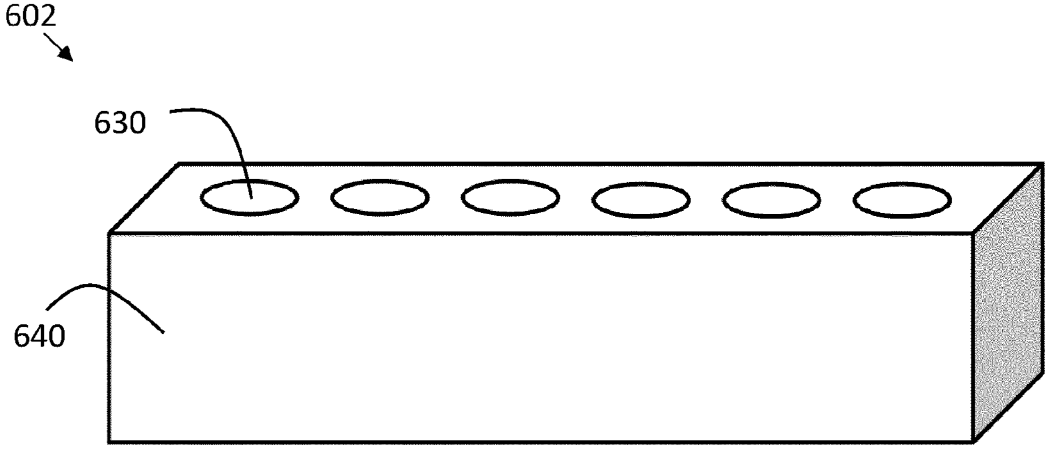
Figure 6C:
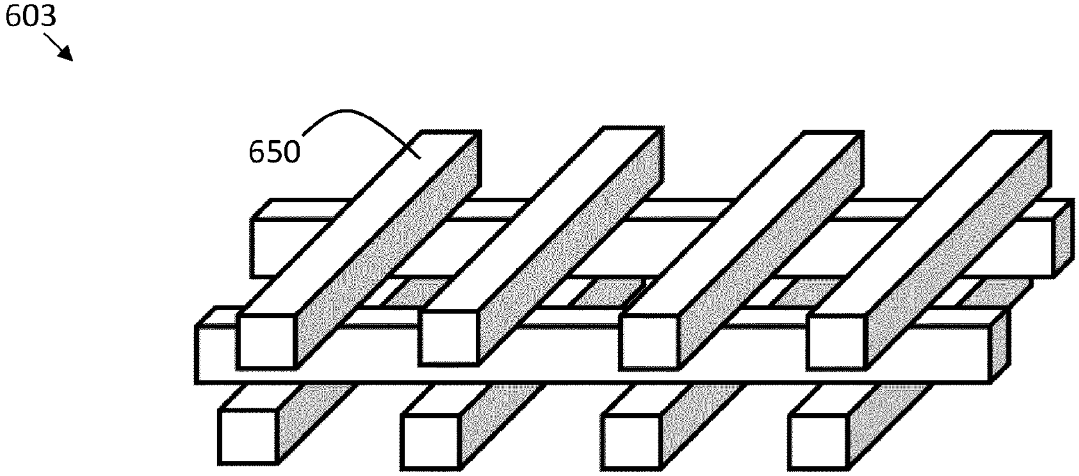

FIGS. 6A, 6B and 6C show examples of how EBG elements of the first and second type may be arranged in an EBG structure. A type of EBG structure 601, shown in FIG. 6A, comprises electrically conductive protrusions 610 on an electrically conductive substrate 620. The protrusions 610 may optionally be encased in a dielectric material. In the example of FIG. 6A, the electrically conductive protrusions constitute the EBG elements of the first type, and the spaces in-between the protrusions, optionally filled with a non-conductive material, constitute the EBG elements of the second type. It is appreciated that the protrusions 610 may be formed in different shapes. FIG. 6A shows an example where the protrusions have a square cross-section, but the protrusions may also be formed with a circular, elliptical, rectangular, or more generally shaped cross-section shapes.

It is also possible that the protrusions are mushroom shaped, as in, e.g. a cylindrical rod on an electrically conductive substrate with a flat electrically conductive circle on top of the rod, wherein the circle has a cross section larger than the cross section of the rod, but small enough to leave space for the second EBG element type between the circles in the EBG structures. Such mushroom-shaped protrusion may be formed in a PCB, wherein the rod comprises a via hole, which may or may not be filled with electrically conductive material.

The protrusions have a length in a direction facing away from the electrically conductive substrate. In general, if the EBG element of the second type is air, the protrusion length corresponds to a quarter of the wavelength in air at the center frequency. The surface along the tops of the protrusions is then close to a perfect magnetic conductor at the center frequency. Even though the protrusions are only a quarter wavelength long at a single frequency, this type of EBG structure still presents a band of frequencies where electromagnetic waves may be attenuated, when the EBG structure faces an electrically conductive surface. In a non-limiting example, the center frequency is 15 GHz and electromagnetic waves in the frequency band 10 to 20 GHz propagating intermediate the EBG structure and the electrically conductive surface are attenuated.

As another example, a type of EBG structure 602 shown in FIG. 6B consists of a single slab of electrically conductive material 640 into which cavities 630 have been introduced. The cavities may be air-filled or filled with a non-conductive material. It is appreciated that the cavities may be formed in different shapes. FIG. 6B shows an example where elliptical cross-section holes have been formed, but the holes may also be formed with circular, rectangular, or more general cross-section shapes. In the example of FIG. 6B, the slab 640 constitutes the EBG elements of the first type, and the holes 630 constitute the EBG elements of the second type. In general, the length (in a direction facing away from the electrically conductive substrate) corresponding to a quarter of the wavelength at the center frequency.

FIG. 6C schematically illustrates a third exemplary type of EBG structure 603 consisting of extended electrically conductive EBG elements 650, optionally rods or slabs, stacked in multiple layers with the rods in a layer arranged at an angle to the rods in a previous layer. In the example of FIG. 6C, the rods constitute EBG elements of the first type and the spaces in between constitutes EBG elements of the second type. The example of FIG. 6C shows an EBG structure where interleaving of EBG elements of the first and second type is achieved in three dimensions.

As mentioned above, the assembly of antenna arrangements comprising conventional waveguide structures is complex and costly due to the demanding manufacturing tolerances. The present disclosure lowers the complexity and cost by having the antenna arrangement comprise EBG structures, and by attaching the layers of the antenna arrangement together with fastening means comprising deformable tails. Examples of such fastening means are rivets, bosses, and studs. This type of attachment is enabled by the EBG structures since they lower the required manufacturing tolerances.

There is, in other words, herein a disclosed an antenna arrangement 100 having a stacked layered structure. The antenna arrangement comprises a radiation layer 110 comprising one or more radiation elements 111. The antenna arrangement further comprises a distribution layer 120 facing the radiation layer 110. The distribution layer 120 is arranged to distribute a radio frequency signal to the one or more radiation elements 111. The distribution layer 120 comprises at least one distribution layer feed 224. Any of the distribution layer 120 and the radiation layer 110 comprises a first electromagnetic bandgap, EBG, structure 121 arranged to form at least one first waveguide intermediate the distribution layer 120 and the radiation layer 110. The first EBG structure is also arranged to prevent electromagnetic radiation in a frequency band of operation from propagating from the at least one first waveguide in directions other than through the at least one distribution layer feed 224 and the one or more radiation elements 111. Furthermore, the radiation layer 110 and the distribution layer 120 are attached to each other with one or more fastening members 101 comprising respective deformable tails 102.

The fastening member 101 is a mechanical fastener. An example of the disclosed fastening member 101 comprising a deformable tail 102 is shown in FIG. 3B. A fastening member with a deformable tail can be a rivets, boss, or stud. A fastening member with a deformable tail is not screw, bolt or the like.

Unlike screws, bolt and the like, a fastening member with a deformable tail forms a permanent joint between two members.

A rivet is often separate from the two members. A rivet can comprise of a cylindrical shaft with a head at one end and a tail at the other end. Various shapes of the shaft and head are possible. During assembly of the two members, the rivet is placed through respective holes in the members, and the tail is deformed (i.e. upset or bucked) to expand, thereby joining the members together. The deformation deforms part the tail into an additional head.

A boss may be an integral part of a member or even a monolithically formed on a layer, i.e., simply a protrusion from a layer. A boss could also be soldered onto a member or be attached in other ways. After the boss is placed in a corresponding mating hole in the other member, the tail of the boss, i.e., the end of the boss, is deformed to expand, thereby joining the members together. A boss can have various types of shapes in the deformed state, such as solid flathead, solid countersunk, or solid dome head. The deformed head may contain a crosshatched pattern for controlled deformation. Furthermore, the boss can be solid or hollow.

Various ways of using a fastening member with a deformable tail in the disclosed antenna arrangement are discussed further below.

Figure 1B:
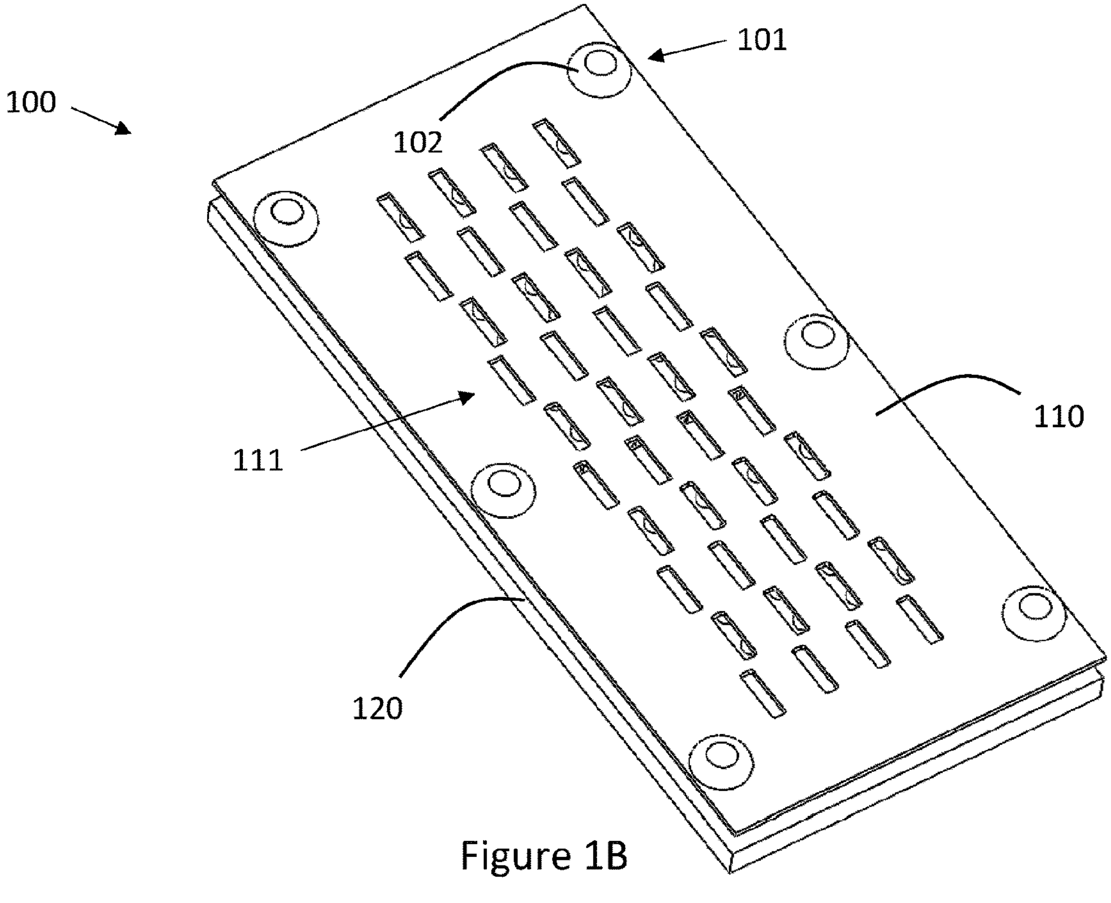
Figure 2A:
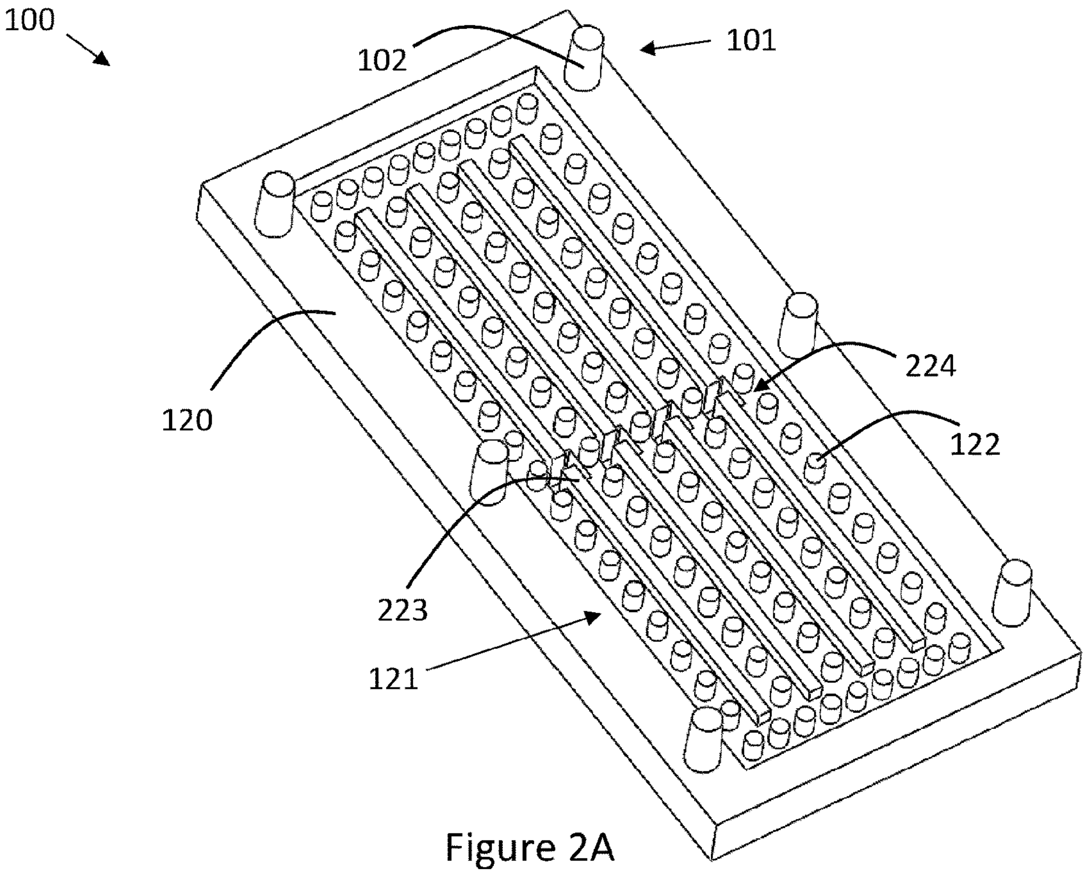
FIGS. 2A and 2B illustrate example antenna arrangements, FIG. 3A schematically illustrate an example antenna arrangement, FIG. 3B schematically illustrate an example fastening member with a deformable tail.
Figure 2B:
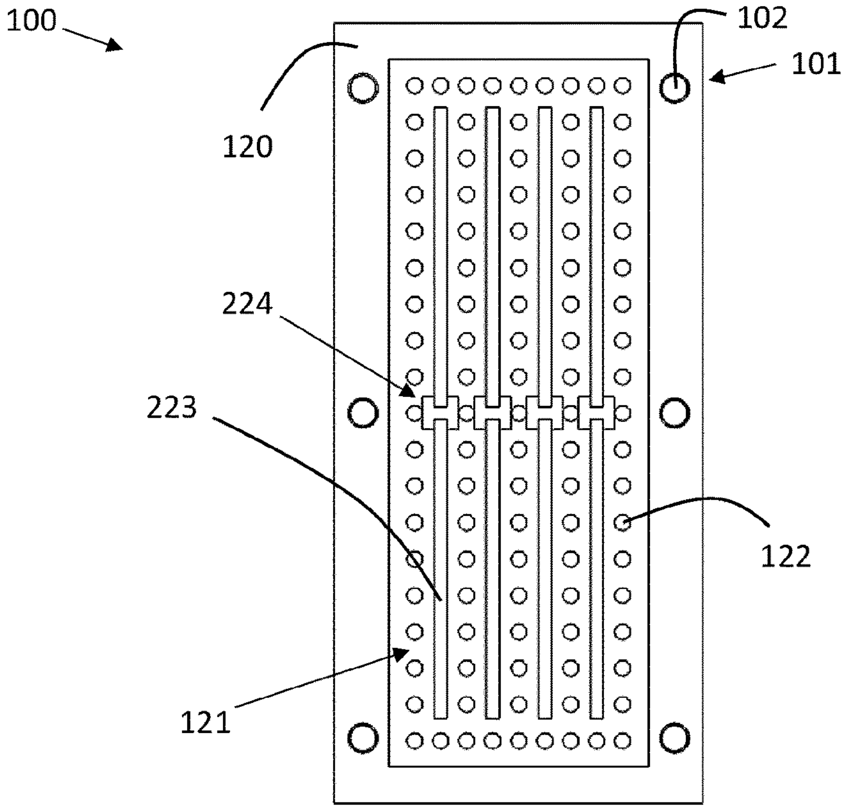

FIGS. 1A and 2A show an example antenna arrangement during assembly before the tails 102 of the fastening members 101 have been deformed. FIG. 1B show the same antenna arrangement after the tails have been deformed.

The at least one distribution layer feed 224 may be a waveguide arranged as through hole arranged to transfer radio frequency signals through the distribution layer. A distribution layer feed can also comprise an extension of the first waveguide to route the RF signal off from the distribution layer. According to aspects, at least one distribution layer feed is arranged to transfer RF signals away the antenna arrangement 100, to, e.g., a modem.

Any of the distribution layer 120 and the radiation layer 110 comprises the first EBG structure 121. In other words, only the distribution layer can comprise the EBG structure, only the radiation layer can comprise the EBG structure, or both layers can comprise the EBG structure. In the latter case, it is possible that the two layers have sections where the EBG structure is overlapping and sections where it is not overlapping. A section here may mean the whole layer.

The distribution layer 120 is arranged with direct contact to the radiation layer 100 or is arranged at a distance from the radiation layer 110, where the distance is smaller than a quarter of a wavelength of center frequency of operation of the antenna arrangement 100. Direct contact can mean that only sections of the two layers are in contact.

The use of EBG structures in the distribution layer provides low losses from the waveguides as well as low interference between radio frequency signals in adjacent waveguides. A consequence of this is that a higher signal to noise ratio can be maintained due to the use and placement of EBG structures in the distribution layer, which is advantageous. Another advantage is that there is no need for electrical contact between the two layers constituting the waveguide. This is an advantage since high precision assembly is not necessary since electrical contact need not be verified. Electrical contact between the layers is, however, also an option.

Example dimensions of a rectangular distribution layer 120 are a thickness of 5 mm and sides 100 mm and 100 mm. The distribution layer is, however, not necessarily rectangular—other shapes are also possible, such as circular or hexagonal.

The radiation layer and distribution layer 120 may comprise metal, such as copper or brass, that has been casted, molded, punched and/or machined. The metal may comprise a coating with high electrical conductivity, e.g. aluminum coated with silver or copper or zinc coated with silver or copper. It is also possible that any of the layers comprise metalized scaffold structures comprising, e.g., plastic. Metallization of plastics can be done in many different ways. For example, a primer can first be applied onto a plastic surface before the plastic surface is coated with a desirable metal. Desirable metals for the metallization of plastics have low loss and high electrical conductivity, e.g., copper, silver, and gold. Many other metals and alloys are also possible. Examples of suitable primers are nickel, chromium, palladium and titanium, although many other materials are also possible. There are many different ways of forming the plastic surface into the desired shape, such as casted, molded, and/or machined.

The shape of the fastening member can be selected dependent on the materials and manufacturing techniques. For example, a boss on a die casted layer can comprise bosses with a shape resulting in a high cast yield.

At least one of the one or more radiation elements 111 in the disclosed antenna arrangement 100 may comprise an aperture. An aperture of the radiation layer 110 may for example be a slot opening extending through the radiation layer. The slot opening is preferably rectangular, although other shapes such as square, round, or more general shapes are also possible. The slot openings are preferably small compared to the size of the radiation layer 110 and arranged in parallel lines on the radiation layer, although other arrangements are possible. If all radiation elements comprise slots, the radiation layer 110 may, e.g., comprise a metal sheet (of e.g. copper or brass). The radiation layer may comprise a sublayer of cavities arranged to form a respective cavity between respective radiation element and the distribution layer. Another example of a radiating element is a bowtie antenna. As a third example, a radiating element may be a patch antenna. Advantageously, both bowtie and patch antennas are easy to manufacture. If all radiation elements comprise patch antennas, the radiation layer 110 may, e.g., comprise a PCB with a ground plane, where the ground plane is facing the distribution layer. It is understood that other types of radiation elements are also possible.

The first EBG structure 121 optionally comprises a repetitive structure of protruding elements 122. Such protruding elements 122 may be monolithically formed on the layer 110, 120 comprising the EBG structure 121, i.e., on the radiation layer 110 and/or on the distribution layer 120. Any of the distribution layer 120 and the radiation layer 110 optionally comprises at least one waveguide ridge 223, thereby forming at least one first gap waveguide intermediate the distribution layer 120 and the radiation layer 110. Details regarding EBG structures comprising protrusions is discussed above in relation to FIG. 6A. Further displayed in FIG. 3A are distribution feeds 224, which are arranged adjacent to the waveguide ridges 223.

Figure 3A:
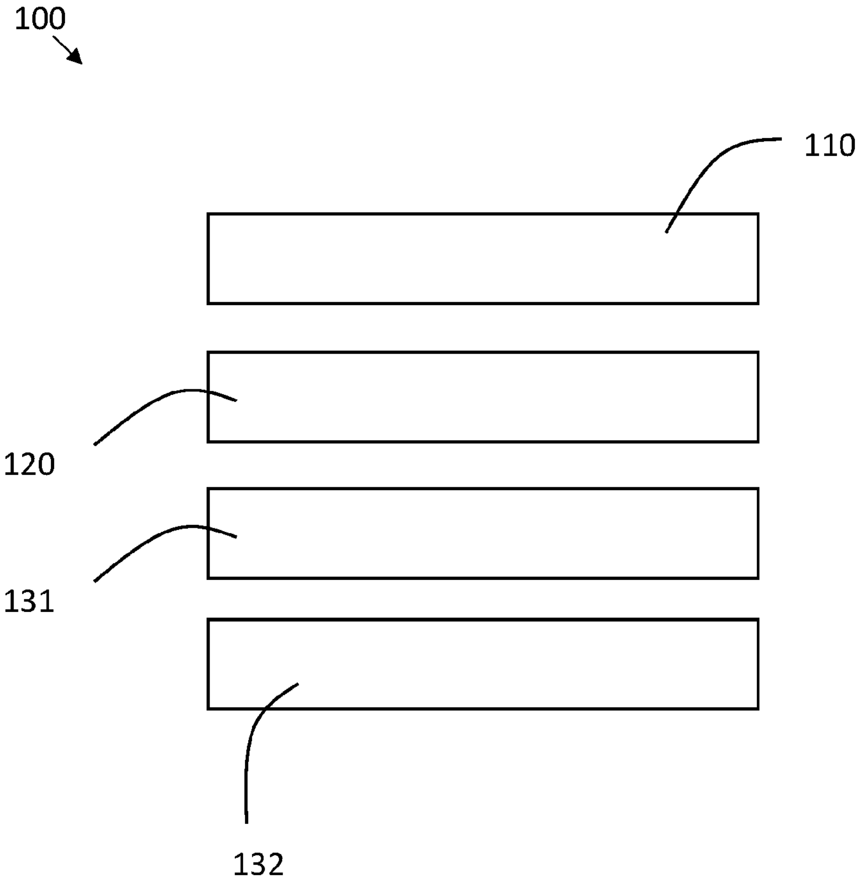
Figure 3B:
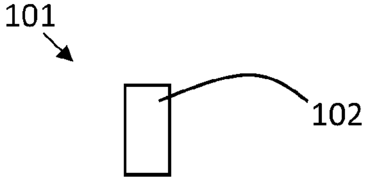

As show in FIG. 3A, the antenna arrangement 100 may further comprise a printed circuit board, PCB, layer 131 facing the distribution layer 120, wherein the PCB layer comprises at least one PCB layer feed. The use of EBG structures in the distribution layer enables highly efficient coupling at the transitions from the PCB layer feeds on the PCB layer 131 through distribution feeds 224 to the at least one first waveguide, which results in low loss. The PCB layer 131 optionally comprises at least one RF integrated circuit (IC) arranged on either or both sides of the PCB layer. The at least one PCB layer feed may be arranged to transfer radio frequency signals from the RF IC(s) to an opposite side of the PCB, into the distribution layer. According to an example, the at least one PCB layer feed is a through hole connected to a corresponding opening in the distribution layer 120, wherein the through hole is fed by at least one microstrip line. Alternatively, or in combination of, the at least one PCB layer feed may be arranged to transfer radio frequency signals from RF IC(s) on the side of the PCB facing the distribution layer into the distribution layer. According to aspects, at least one PCB layer feed is arranged to transfer radio frequency signals away the antenna arrangement 100, to, e.g., a modem. The PCB layer may comprise a stamped or etched metal plate as a ground plane or as a complimentary ground plane.

As show in FIG. 3A, the antenna arrangement 100 may further comprise a shield layer 132 facing the PCB layer 131.

The shield layer 132 optionally comprises a second EBG structure arranged to form at least one second waveguide intermediate the shield layer 132 and the PCB layer 131. The second EBG structure is also arranged to prevent electromagnetic radiation in a frequency band of operation from propagating from the at least one second waveguide in directions other than through the at least one PCB layer feed. The second EBG structure allows a compact design with low loss and low leakage, i.e. unwanted electromagnetic propagation between, e.g., adjacent waveguides or between adjacent RFICs. Furthermore, the second EBG structure shields the PCB layer from electromagnetic radiation outside of the antenna arrangement.

The second EBG structure optionally comprises a repetitive structure of protruding elements, and the PCB layer optionally comprises a ground plane and at least one planar transmission line, thereby forming at least one second gap waveguide intermediate the shield layer 132 and the PCB layer 131. The at least one second gap waveguide may, e.g., be an inverted microstrip gap waveguide. The shield layer may comprise two types of protruding elements. For example, narrow tall pins and wide short pins. The wider and shorter pins can be adapted to fit RFICs between the shield layer and the PCB layer. The pins may contact RFICs for heat transfer purposes.

According to aspects, the distribution layer 120 comprises a third EBG structure, which is arranged on the opposite side of the first EBG structure 121, i.e., the third EBG structure faces the PCB layer 131. This way, gap waveguides may be formed intermediate the distribution layer 120 and the PCB layer 131. These gap waveguides may be used for coupling electromagnetic signals between RFICs on the PCB layer 131 and the PCB layer feeds. The third EBG structure allows a compact design with low loss and low leakage, i.e. unwanted electromagnetic propagation between, e.g., adjacent waveguides or between adjacent RFICs. Furthermore, the third EBG structure shields the PCB layer from electromagnetic radiation outside of the antenna arrangement.

According to aspects, a telecommunication or radar transceiver comprises the antenna arrangement 100.

The fastening member 101 may be integrally and preferably monolithically formed on any of the layers, and its tail may pass through a corresponding mating hole in one layer or in corresponding mating holes in multiple layers. In other words, the tail may be deformed after passing through a corresponding mating hole in one layer or it may be deformed after passing through corresponding mating holes in multiple layers. As such, the fastening member may join two or more layers together. The fastening member may be formed on any of the layers in a die forming manufacturing process, casting process, or the like.

As mentioned, according to aspects, any of the layers are metalized plastic. As such, the fastening member 101 may comprise the same plastic and the same metallization. It is also possible that that the fastening member comprises the same plastic but a different metallization, or even no metallization at all. Such embodiments can be manufactured by covering parts of the plastic member to be metalized.

Bellow follow different embodiments with different arrangements of the fastening member 101. All these embodiments may or may not be used in combination with each other.

At least one fastening member 101 may be integrally and preferably monolithically formed on the distribution layer 120, wherein the tail 102 of that particular fastening member 101 is arranged in a corresponding mating hole 103 on the radiation layer 110.

At least one fastening member 101 may be integrally and preferably monolithically formed on the radiation layer 110, wherein the tail 102 of that particular fastening member 101 is arranged in a corresponding mating hole on the distribution layer 120.

At least one fastening member 101 may be integrally and preferably monolithically formed on the distribution layer 120, wherein the tail 102 of that particular fastening member 101 is arranged in a corresponding mating hole on the PCB layer 131 and/or a corresponding mating hole in the shield layer 132.

At least one fastening member 101 may be integrally and preferably monolithically formed on the shield layer 132, wherein the tail 102 of that particular fastening member 101 is arranged in a corresponding mating hole on the PCB layer 131 and/or a corresponding mating hole on the distribution layer 120.

At least one fastening member 101 may be integrally and preferably monolithically formed on the shield layer 132, wherein the tail 102 of that particular fastening member 101 is arranged in corresponding mating holes in the PCB layer 131, the distribution layer 120, and the radiation layer 120.

At least one fastening member 101 may be integrally and preferably monolithically formed on the radiation layer 110, wherein the tail 102 of that particular fastening member 101 is arranged in corresponding mating holes in the distribution layer 120, the PCB layer 131, and the shield layer 132.

According to aspects, the tail 102 of at least one fastening member 101 is deformed by staking. Staking can be done in many different ways. One way is to use a stake punch, i.e. to apply a force to the tail to expand it radially and to compress it axially. Thermoplastic staking, also called heat staking, can be used to deform a fastening member comprising plastic. Such techniques are quick, cost-effective, and consistent. It is possible to joining a plastic fastening member to a wide variety of materials. If the plastic fastening member is an integral part of one layer, the other layer can, e.g., be metal, PCB, other plastic material etc. Some examples of thermoplastic staking techniques are thermal tooling, cold forming, thermal punch (or hot punch), ultrasonic staking, cold forming, infrared staking, hot air cold upset, and impulse staking. Spin riveting is also a deformation method. There are also many other suitable deformation methods.

According to aspects, at least one fastening member 101 is any of a solid rivet, blind rivet, semi-tubular rivet, and self-piercing rivet. Other types of rivets are also possible.

Any of the layers optionally comprises one or more alignment members. The one or more alignment members are arranged to align the layers with respect to each other. The one or more alignment members are arranged to mate with one or more corresponding alignment members. An alignment member and a corresponding alignment member may, e.g., be a pin and a hole. The one or more corresponding alignment members may be arranged on: the radiation layer 110; the distribution layer 120; the PCB layer 131; and/or on the shield layer 132. According to aspects, one or more of alignment members are edge alignment members. The one or more edge alignment members are arranged such that any of the layers can only be assembled in a single and correct orientation. In other words, the one or more edge alignment members make the layers rotationally asymmetric (in the plane extending along the distribution layer). This is an advantage in the assembling of the antenna arrangement 100.

There is also disclosed herein a microwave device 400 comprising a first conductive layer 411 and a second conductive layer 412 facing each other. Any of the first and the second conductive layers comprises an electromagnetic bandgap, EBG, structure 421 arranged to form at least one first waveguide intermediate the first 411 and the second 412 conductive layers. The EBG structure is also arranged to prevent electromagnetic radiation in a frequency band of operation from propagating from the at least one first waveguide in directions other than along an intended waveguiding path. The first 411 and the second 412 conductive layers are attached to each other with one or more fastening members 101 comprising respective deformable tails 102.

Figure 4A:
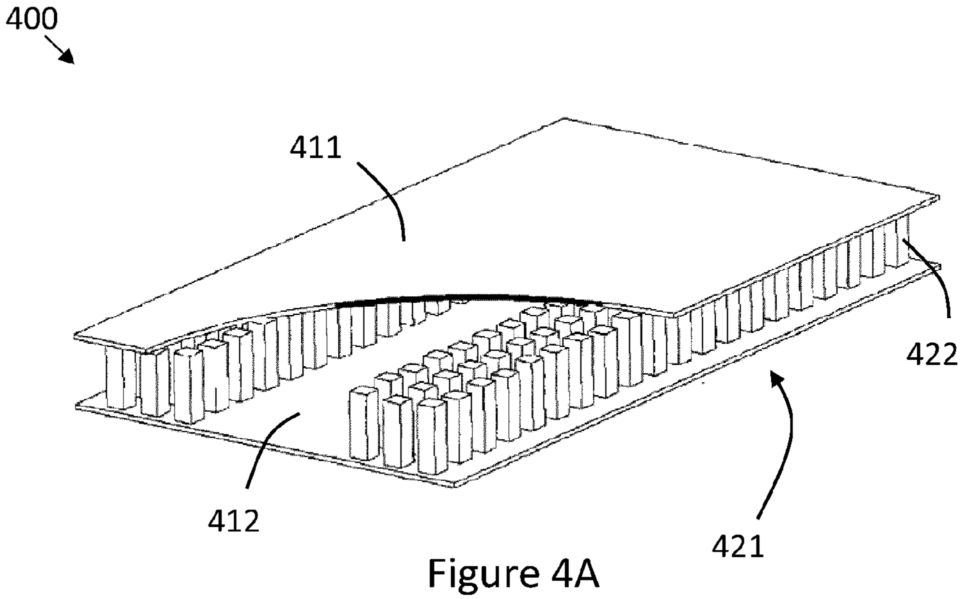
FIGS. 4A and 4B show example microwave devices.
Figure 4B:
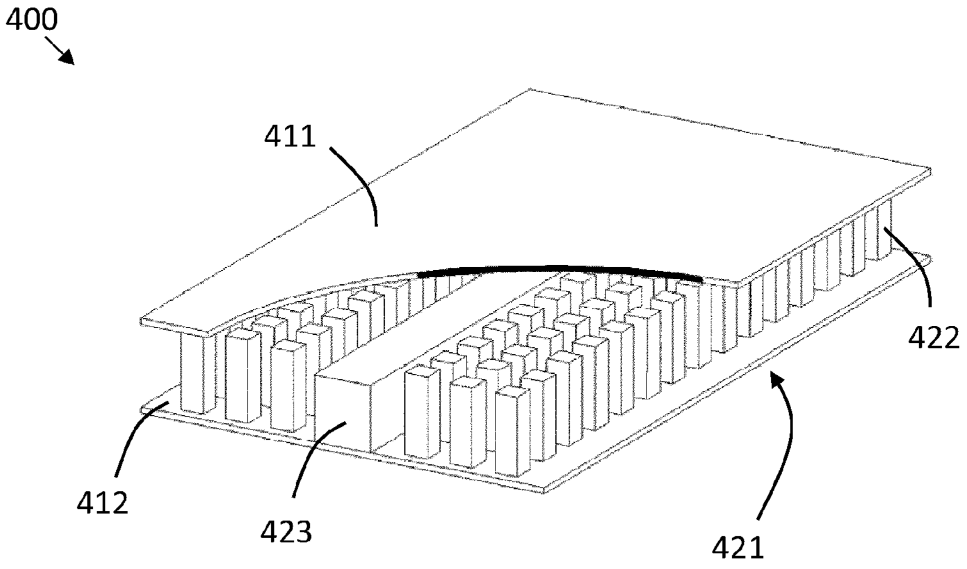
Figure 5:
FIG. 5 is a flow chart illustrating methods.

The microwave device 400 may be any of a waveguide, transmission line, waveguide circuit, transmission line circuit, and radio frequency part of an antenna system. FIGS. 4A and 4B show different examples of the disclosed microwave device.

The intended waveguiding path is the path which the waveguide is intended to guide the electromagnetic radiation. For example, a microwave device comprising two separate waveguides, wherein it is intended that the two waveguides are isolated, then the intended waveguiding path is along the respective waveguide. The EBG structure 421 provides the isolation between the two waveguides. Other examples of the intended waveguiding path are a corporate feeding network, a waveguide connecting a distribution feed and a radiating element, and a waveguide connecting different integrated components on a PCB.

The fastening members of the microwave device 400 can be the same type of fastening members 101 as in the antenna arrangement 100, which can be the example fastening member in FIG. 3B.

The disclosed microwave device 400 lowers the complexity and cost by having the device comprise EBG structures, and by attaching the first and second layers together with fastening means comprising deformable tails, such as rivets, bosses, or studs. Such attachment is enabled by the EBG structures since they lower the required manufacturing tolerances.

At least one fastening member may be integrally and preferably monolithically formed on the first conductive layer 411 and the tail of that fastening member is arranged in mating hole on the second conductive layer 412. According to aspects, the tail of at least one fastening member is deformed by staking.

At least one fastening member may be any of a solid rivet, blind rivet, semi-tubular rivet, and self-piercing rivet.

The EBG structure 421 of the microwave device 400 may comprise a repetitive structure of protruding elements 422. According to aspects, the protruding elements 422 are monolithically formed on the any of the first 411 and second 412 conductive layers.

Any of the first 411 and the second conductive layers 412 may comprise at least one waveguide ridge 423, thereby forming at least one first ridge gap waveguide intermediate the first 411 and the second 412 conductive layers. A ridge gap waveguide is demonstrated in the example microwave device 400 of FIG. 4B.

There is also disclosed herein a method for producing a microwave device 400. The method comprises:

providing S1 a first conductive layer 411 having an electromagnetic bandgap, EBG, structure 421;

arranging S2 a second conductive layer 412 over the first conductive layer 411, thereby enclosing the EBG structure 421 and forming at least one first waveguide intermediate the first 411 and the second 412 conductive layers, wherein the EBG structure 421 prevents electromagnetic radiation in a frequency band of operation from propagating from the at least one first waveguide in directions other than along an intended waveguiding path; and attaching (S3) the first 411 and the second 411 conductive layers to each other with one or more fastening members 101 comprising respective deformable tails 102.

The microwave device 400 of the method may be any of a waveguide, transmission line, waveguide circuit, transmission line circuit, or radio frequency part of an antenna system.

The invention claimed is:

1. An antenna arrangement having a stacked layered structure, the antenna arrangement comprising:

a radiation layer comprising one or more radiation elements, and a distribution layer facing the radiation layer, wherein the distribution layer is arranged to distribute a radio frequency signal to the one or more radiation elements, the distribution layer comprising at least one distribution layer feed, a printed circuit board, PCB, layer facing the distribution layer, wherein the PCB layer comprises at least one PCB layer feed; and a shield layer facing the PCB layer, wherein any of the distribution layer and the radiation layer comprises a first electromagnetic bandgap, EBG, structure arranged to form at least one first waveguide intermediate the distribution layer and the radiation layer, the first EBG structure also arranged to prevent electromagnetic radiation in a frequency band of operation from propagating from the at least one first waveguide in directions other than through the at least one distribution layer feed and the one or more radiation elements, wherein the radiation layer and the distribution layer are attached to each other with one or more fastening members comprising respective deformable tails.

2. The antenna arrangement of claim 1, wherein at least one fastening member is integrally or monolithically formed on the distribution layer and/or on the radiation layer, and wherein the tail of that particular fastening member is arranged in a corresponding mating hole on the radiation layer or distribution layer, respectively.

3. The antenna arrangement of claim 1, wherein the tail of at least one fastening member is deformed by staking.

4. The antenna arrangement of claim 1, wherein at least one fastening member is any of a solid rivet, blind rivet, semi-tubular rivet, and self-piercing rivet.

5. The antenna arrangement of claim 1, wherein at least one of the one or more radiation elements comprises an aperture.

6. The antenna arrangement of claim 1, wherein the first EBG structure comprises a repetitive structure of protruding elements.

7. The antenna arrangement of claim 1, wherein any of the distribution layer and the radiation layer comprises at least one waveguide ridge, thereby forming at least one first ridge gap waveguide intermediate the distribution layer and the radiation layer.

8. The antenna arrangement of claim 1, wherein at least one fastening member is integrally or monolithically formed on the distribution layer, and wherein the tail of that particular fastening member is arranged in a corresponding mating hole on the PCB layer and/or a corresponding mating hole in the shield layer.

9. The antenna arrangement of claim 1, wherein at least one fastening member is integrally or monolithically formed on the shield layer, and wherein the tail of that particular fastening member is arranged in a corresponding mating hole on the PCB layer and/or a corresponding mating hole on the distribution layer.

10. The antenna arrangement of claim 1, wherein at least one fastening member is integrally or monolithically formed on the shield layer, and wherein the tail of that particular fastening member is arranged in corresponding mating holes in the PCB layer, the distribution layer, and the radiation layer.

11. The antenna arrangement of claim 1, wherein the shield layer comprises a second EBG structure arranged to form at least one second waveguide intermediate the shield layer and the PCB layer, the second EBG structure also arranged to prevent electromagnetic radiation in a frequency band of operation from propagating from the at least one second waveguide in directions other than through the at least one PCB layer feed.

12. The antenna arrangement of claim 11, wherein the second EBG structure comprises a repetitive structure of protruding elements, and wherein the PCB layer comprises a ground plane and at least one planar transmission line, thereby forming at least one second gap waveguide intermediate the shield layer and the PCB layer.

* * * * *